US010150522B2

(12) United States Patent
Scarth et al.

(10) Patent No.: US 10,150,522 B2
(45) Date of Patent: Dec. 11, 2018

(54) INDUSTRIAL CART COMPRISING A MOTHER OR PRIMARY CART AND A SECONDARY OR DAUGHTER CART

(71) Applicants:Ian Scarth, King City (CA); Danny W. Pitcher, Stirling (CA)

(72) Inventors: Ian Scarth, King City (CA); Danny W. Pitcher, Stirling (CA)

(*) Notice: Subject to any disclaimer, the term of this patent is extended or adjusted under 35 U.S.C. 154(b) by 0 days.

(21) Appl. No.: 15/831,046

(22) Filed: Dec. 4, 2017

(65) Prior Publication Data

US 2018/0086396 A1    Mar. 29, 2018

Related U.S. Application Data

(62) Division of application No. 14/724,321, filed on May 28, 2015, now Pat. No. 9,862,435.

(60) Provisional application No. 62/003,995, filed on May 28, 2014.

(51) Int. Cl.
  *B62D 53/04* (2006.01)
  *B62D 63/08* (2006.01)
  *B62D 53/00* (2006.01)
  *B62D 63/06* (2006.01)
  *B60P 1/02* (2006.01)

(52) U.S. Cl.
  CPC .............. *B62D 53/04* (2013.01); *B60P 1/02* (2013.01); *B62D 53/005* (2013.01); *B62D 63/06* (2013.01); *B62D 63/08* (2013.01)

(58) Field of Classification Search
  CPC ...... B62D 53/04; B62D 53/005; B62D 63/06; B62D 63/08; B60P 1/02
  See application file for complete search history.

(56) References Cited

U.S. PATENT DOCUMENTS

| 2,903,219 | A | * | 9/1959 | Ingham, Jr. | B62B 3/08 |
| | | | | | 220/646 |
| 3,608,920 | A | * | 9/1971 | Rubin | B62B 3/16 |
| | | | | | 280/33.998 |
| 3,631,999 | A | * | 1/1972 | Walerowski | B60P 3/40 |
| | | | | | 254/2 R |
| 3,887,207 | A | * | 6/1975 | Gotsch, Jr. | B62B 3/10 |
| | | | | | 108/187 |
| 4,515,518 | A | * | 5/1985 | Gilbert | B60P 1/6445 |
| | | | | | 280/43.23 |
| D448,135 | S | * | 9/2001 | Petro | D34/17 |
| 6,866,463 | B2 | * | 3/2005 | Riordan | B62B 3/04 |
| | | | | | 280/79.3 |

(Continued)

OTHER PUBLICATIONS

U.S. Appl. No. 62/003,995, filed May 28, 2014, Sailrail.

(Continued)

*Primary Examiner* — Anne Marie M Boehler
*Assistant Examiner* — Michael R Stabley
(74) *Attorney, Agent, or Firm* — Workman Nydegger

(57) ABSTRACT

In one example, a mother cart is provided that is suitable for transporting a daughter cart. The mother cart includes a lower frame, an upper frame connected to the lower frame, and the lower frame includes wheels configured to allow the mother cart to be moved. The lower frame also includes support guides configured to support the daughter cart in a raised position to provide a predetermined ground clearance, and the lower frame has two open sides so as to provide for two-way loading and unloading of the daughter cart on the mother cart.

9 Claims, 18 Drawing Sheets

(56) References Cited

U.S. PATENT DOCUMENTS

| | | | | |
|---|---|---|---|---|
| 7,559,736 B1* | 7/2009 | Mohan | ............... | B60P 1/027 |
| | | | | 254/2 C |
| 7,806,646 B2* | 10/2010 | Riordan | ............... | B62B 3/04 |
| | | | | 180/14.1 |
| 8,302,975 B2* | 11/2012 | Hergeth | ............... | B62B 3/04 |
| | | | | 280/47.19 |
| 8,360,459 B2* | 1/2013 | Holtan | ............... | B60D 1/02 |
| | | | | 280/458 |
| 8,505,933 B2* | 8/2013 | Bernard | ............ | B62B 3/005 |
| | | | | 280/33.995 |
| 8,540,255 B2* | 9/2013 | Young | ............ | B62B 3/10 |
| | | | | 280/47.34 |
| 8,590,921 B2* | 11/2013 | Benson | ............ | B62B 3/008 |
| | | | | 182/123 |
| 9,211,900 B2* | 12/2015 | Knepp | ............ | B62B 3/08 |
| 9,227,645 B2* | 1/2016 | Franco | ............ | B60K 7/0007 |
| 2009/0166999 A1* | 7/2009 | Mason | ............ | B62B 3/02 |
| | | | | 280/651 |
| 2010/0066045 A1* | 3/2010 | Presnell | ............ | B62B 1/12 |
| | | | | 280/47.18 |

OTHER PUBLICATIONS

U.S. Appl. No. 14/724,321, filed May 28, 2015, Ian Scarth, et al.
U.S. Appl. No. 14/724,321, filed Sep. 19, 2016, Office Action.
U.S. Appl. No. 14/724,321, filed Apr. 6, 2017, Final Office Action.
U.S. Appl. No. 14/721,321, filed Sep. 5, 2017, Notice of Allowance.

* cited by examiner

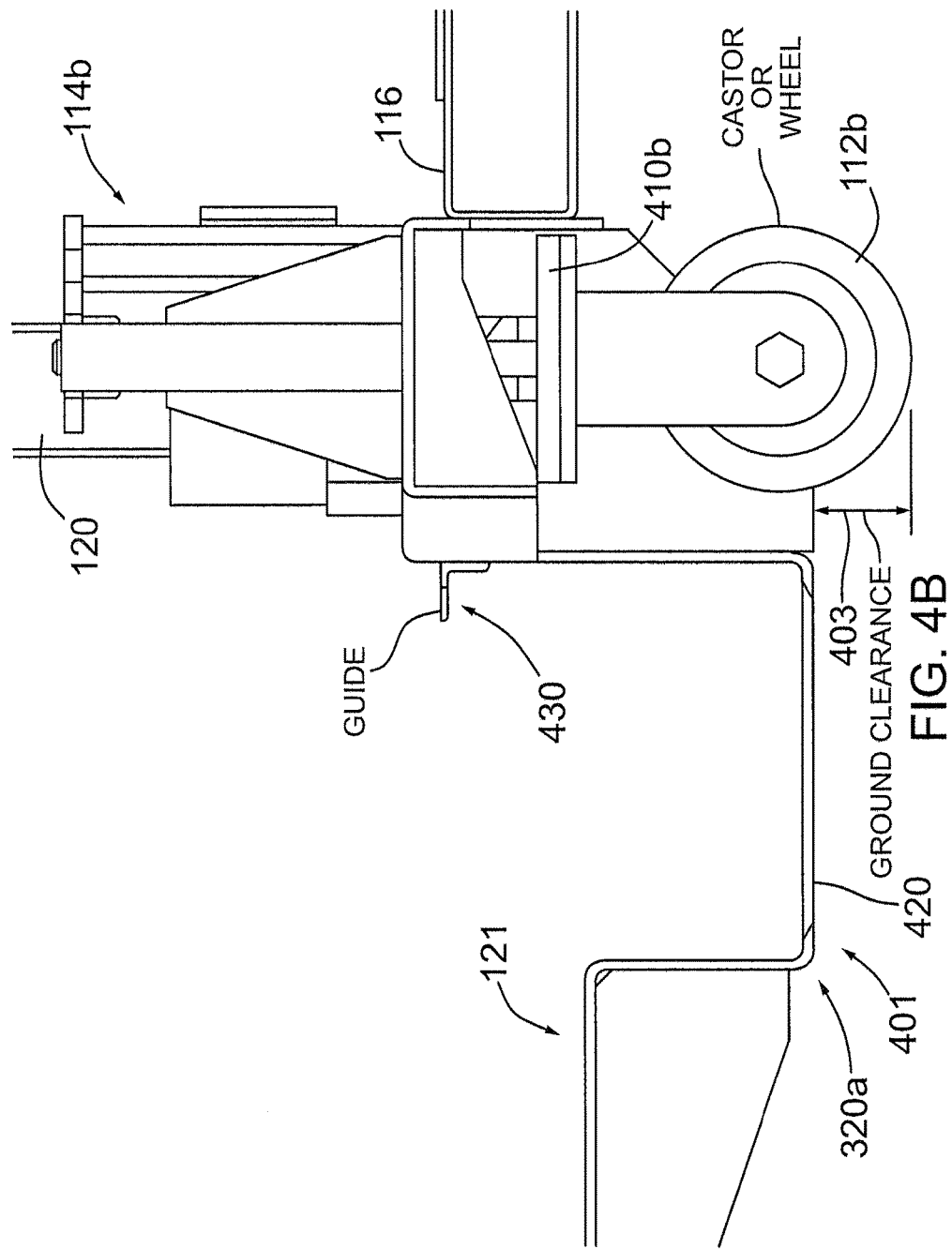

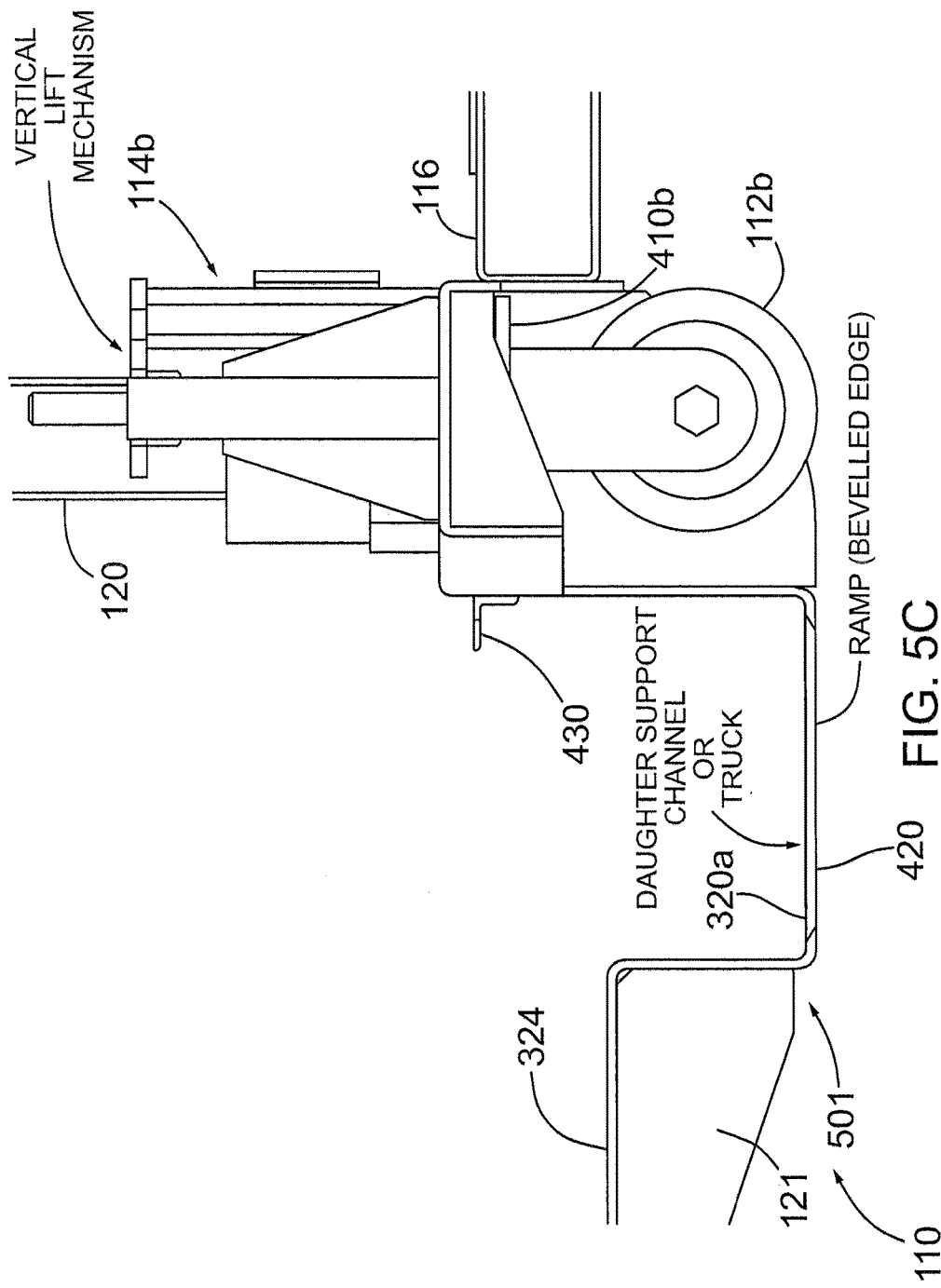

INDUSTRIAL CART COMPRISING A MOTHER OR PRIMARY CART AND A SECONDARY OR DAUGHTER CART

RELATED APPLICATIONS

This application is a divisional of U.S. patent application Ser. No. 14/724,321, entitled INDUSTRIAL CART COMPRISING A MOTHER OR PRIMARY CART AND A SECONDARY OR DAUGHTER CART, and filed May 28, 2015, which claims priority to U.S. Provisional Patent Application Ser. No. 62/003,995, entitled INDUSTRIAL CART COMPRISING A MOTHER OR PRIMARY CART AND A SECONDARY OR DAUGHTER CART, and filed on May 28, 2014. All of the aforementioned applications are incorporated herein in their respective entireties by this reference.

FIELD OF THE INVENTION

The present invention relates to industrial cart systems, and more particularly, to industrial cart comprising a mother or primary cart and a secondary or daughter cart.

BACKGROUND OF THE INVENTION

In the art, forklifts have traditionally been used to deliver or move materials, for example, palletized loads, in a factory or other industrial plant. For a variety of reasons, including safety concerns, plants have been moving to being "forklift free".

The movement of materials or parts and/or material containers in a plant is typically done using automated guided vehicles ("AGV") or a man-on-board system or a combination of both. In a typical man-on-board system, the material or components are moved in plant using a train of carts, and a human operator unloads the carts and removes empty carts. Because a human operator is involved, there will be limits on the size and/or weight of loads and/or cart configurations that can be handled, for example, based on a safety and/or physical handling considerations.

Accordingly, there remains a need for improvements in the art.

BRIEF SUMMARY OF THE INVENTION

The present invention is directed to an industrial cart system comprising a mother and daughter configuration. According to an exemplary implementation or application one or more mother/daughter cart units are coupled together and moved through an industrial plant by a tractor or other drive mechanism. The daughter cart is disengageable from the associated mother cart and is offloaded or disengaged, for example, to deliver parts, components or other materials, at a work station or assembly station in the plant. The empty daughter cart is loaded back onto the mother cart and moved.

According to another exemplary implementation or embodiment, a method or process is provided comprising coupling one or more mother/daughter cart units together and moving the coupled mother/daughter cart units through an industrial plant utilizing a tractor, or a drive mechanism integrated with the industrial plant, for delivery of parts, components or other materials, or removal or transfer of parts, components or other materials, at or from one or more work stations or assembly stations in the industrial plant.

According to one aspect, the present invention comprises a mother cart suitable for transporting a daughter cart, the mother cart comprises: a lower frame; an upper frame, the upper frame being connected to the lower frame; the lower frame including a plurality of wheels configured to allow the mother cart to be moved; the lower frame including a plurality of support guides, the support guides being configured to support the daughter cart in a raised position to provide a predetermined ground clearance; and the lower frame having two open sides so as to provide for two-way loading and unloading of the daughter cart on the mother cart.

According to another aspect, the present invention comprises mother cart suitable for transporting a daughter cart, the mother cart comprises: a lower frame; an upper frame, the upper frame being connected to the lower frame, and the lower frame providing a support structure; the lower frame including a plurality of wheels configured to allow the mother cart to be moved; a chassis, the chassis spanning the lower frame and being configured to provide a predetermined ground clearance, the chassis including first and second daughter cart channels, wherein each of the daughter cart channels is configured to support a section of the daughter cart.

According to yet another aspect, the present invention comprises an industrial cart train comprising: two or more mother carts coupled together to form a parts delivery system suitable for an industrial application; each of the mother carts comprising, a lower frame; an upper frame, the upper frame being connected to the lower frame; the lower frame including a plurality of wheels configured to allow the mother cart to be moved; the lower frame including a plurality of support guides, the support guides being configured to support a daughter cart in a raised position to provide a predetermined ground clearance; and the lower frame having two open sides so as to provide for two-way loading and unloading of the daughter cart on the mother cart.

According to a further aspect, the present invention comprises an industrial parts delivery system comprising: two or more mother carts coupled together to form a train of carts, and one of the mother carts being configured to be coupled to a tractor; the mother cart comprising: a lower frame; an upper frame, the upper frame being connected to the lower frame, and the lower frame providing a support structure; the lower frame including a plurality of wheels configured to allow the mother cart to be moved; and a chassis, the chassis spanning the lower frame and being configured to provide a predetermined ground clearance, the chassis including first and second daughter cart channels, wherein each of the daughter cart channels is configured to support a section of a daughter cart.

Other aspects and features of the present invention will become apparent to those ordinarily skilled in the art upon review of the following description of embodiments of the invention and/or the accompanying figures.

BRIEF DESCRIPTION OF THE DRAWINGS

Reference will now be made to the accompanying drawings which show, by way of example, embodiments of the present invention, and in which:

FIGS. 4A and 4B show views of the mother cart of FIG. 3B in the raised, e.g. loaded or travel position;

FIGS. 5A to 5C show views of the mother cart of FIG. 3B in the lowered or daughter cart unloading/loading position;

In the drawings, like reference numerals indicated like components or elements.

DETAILED DESCRIPTION OF THE EMBODIMENTS OF THE INVENTION

Figure 1A:
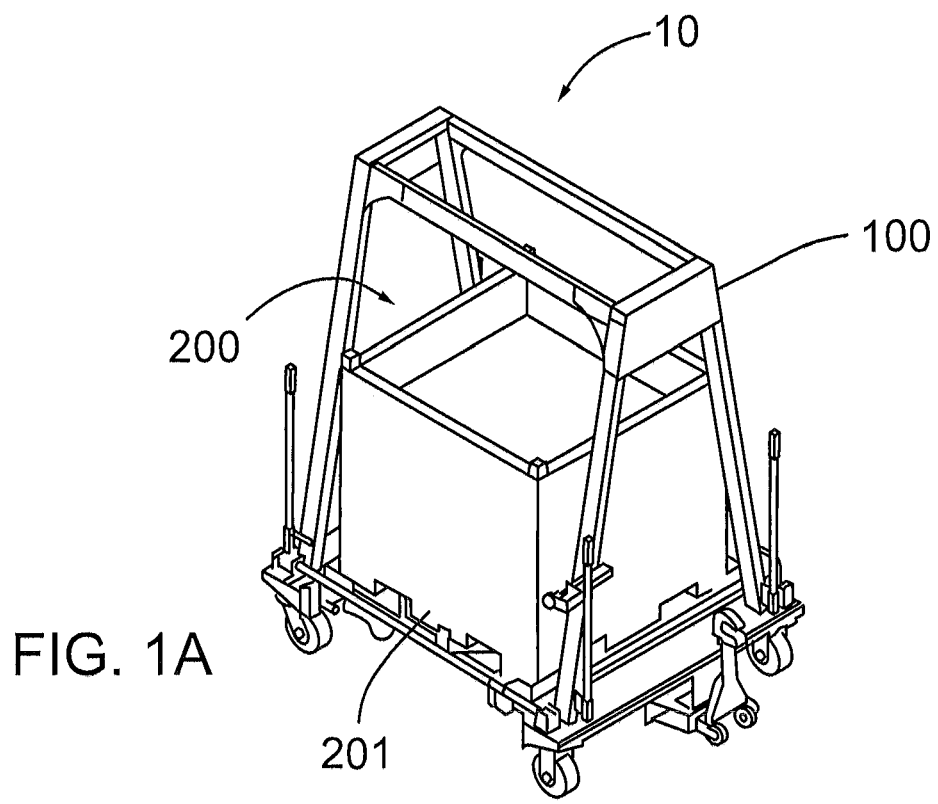
FIG. 1A shows in diagrammatic form a mother or primary cart with a daughter or secondary cart in the engaged or loaded position or configuration according to an embodiment of the present invention.
Figure 1D:
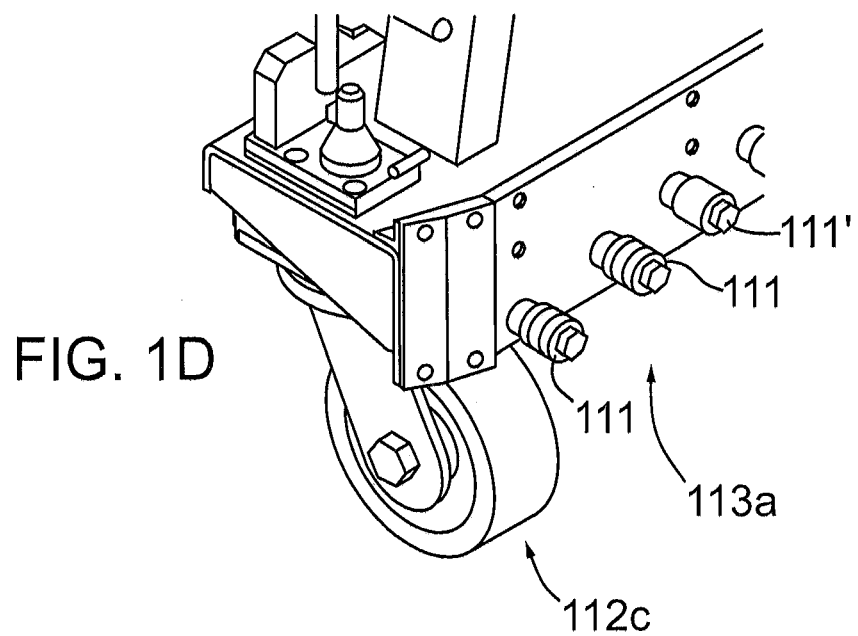
FIG. 1D is a partial view of the lower frame of the mother cart of FIG. 1A and showing the daughter cart support members/loading guides in more detail.
Figure 1B:
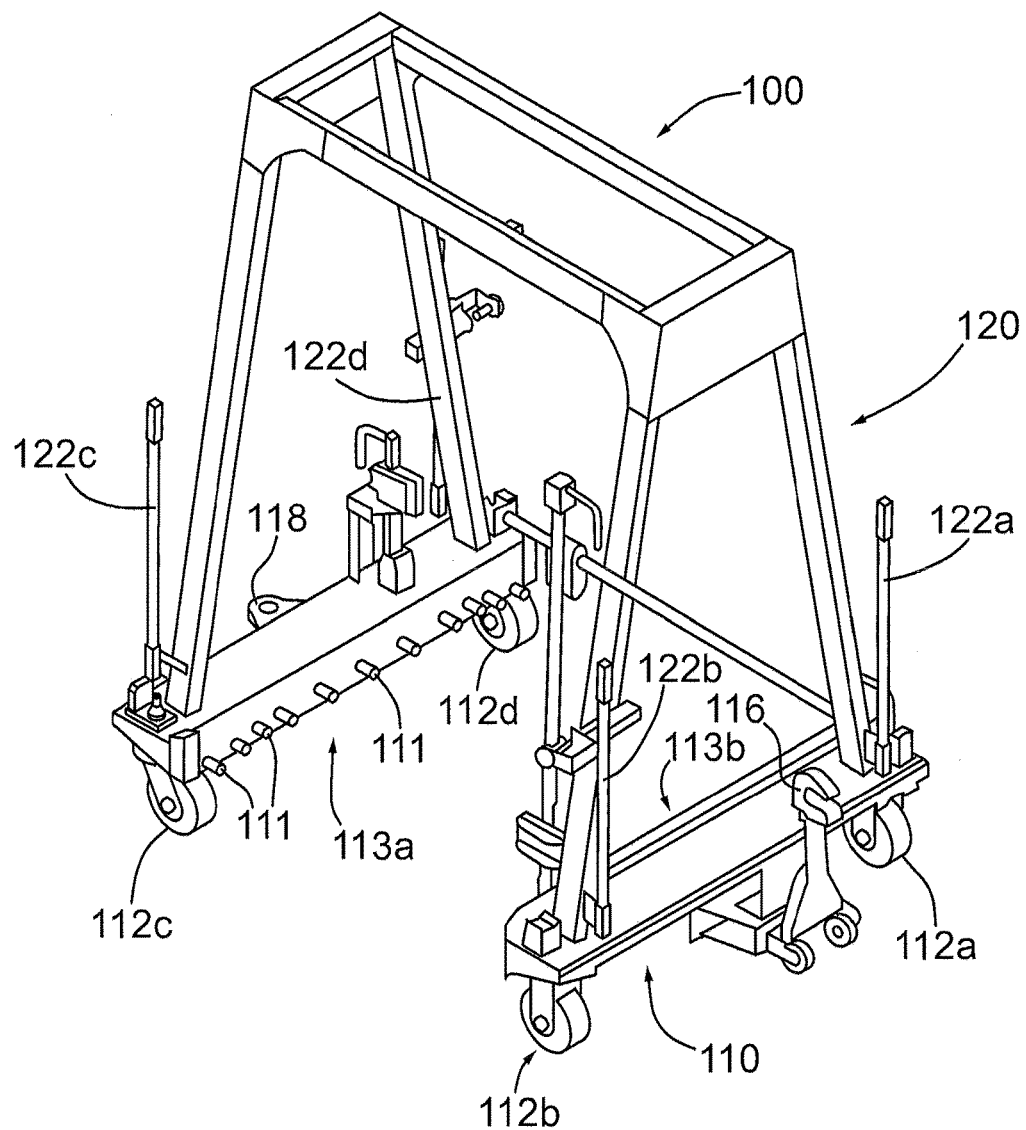
FIG. 1B shows the mother cart of FIG. 1A with the daughter cart removed.
Figure 6:
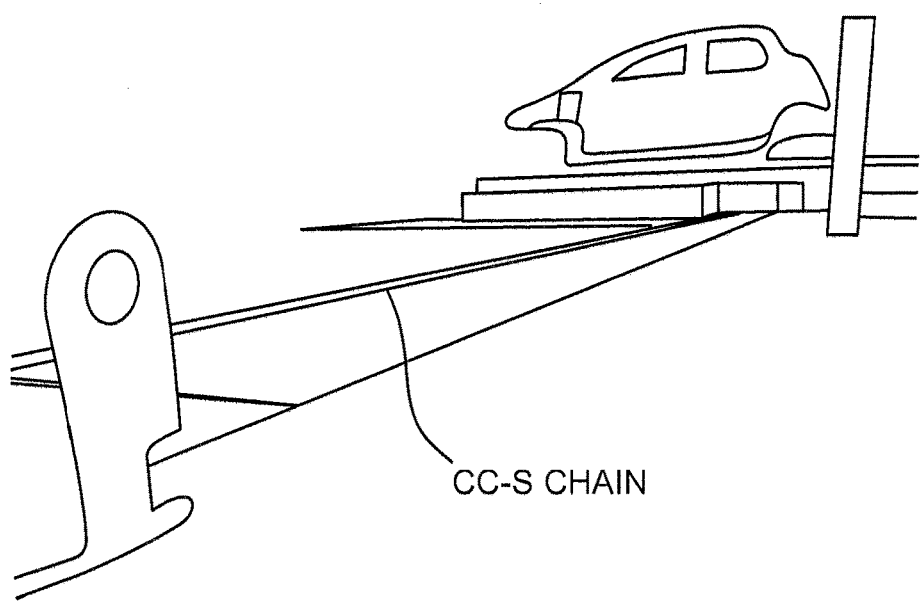
FIG. 6 is a reproduced photograph of an exemplary industrial plant or facility configured with a "CC-5" chain mechanism configured for moving a train of one or more mother/daughter carts according to the present invention

Reference is first made to FIGS. 1A and 1B, which show a mother cart and a daughter cart configuration according to an embodiment of the present invention and indicated generally by reference 10. The mother or primary cart indicated generally by reference 100 is configured to carry or transport a daughter or secondary cart indicated generally by reference 200. The daughter cart 200 may take various forms, some of which are described in more detail below, and is generally configured to carry a load, for example, automotive components or parts in a bin or other container, as indicated by reference 210 in FIG. 1A, that is loaded onto the daughter cart or an integral component of the daughter cart 200. As will be described in more detail below, the mother cart 100 is configured to provide for two-way loading and unloading of the daughter cart 200. The daughter cart 200 may be implemented in a number of configurations as will be described in more detail below. The mother carts 100 are configured to be coupled together to form a series, e.g. a train, of mother/daughter carts 10, which can be moved through an industrial facility or plant, for example, by a tractor, or other human operated or automated machine, pulling the mother carts 100, or, for example, by a moving or motive mechanism installed in the industrial facility, such as a CC-5 chain mechanism (as shown in FIG. 6).

Figure 2A:
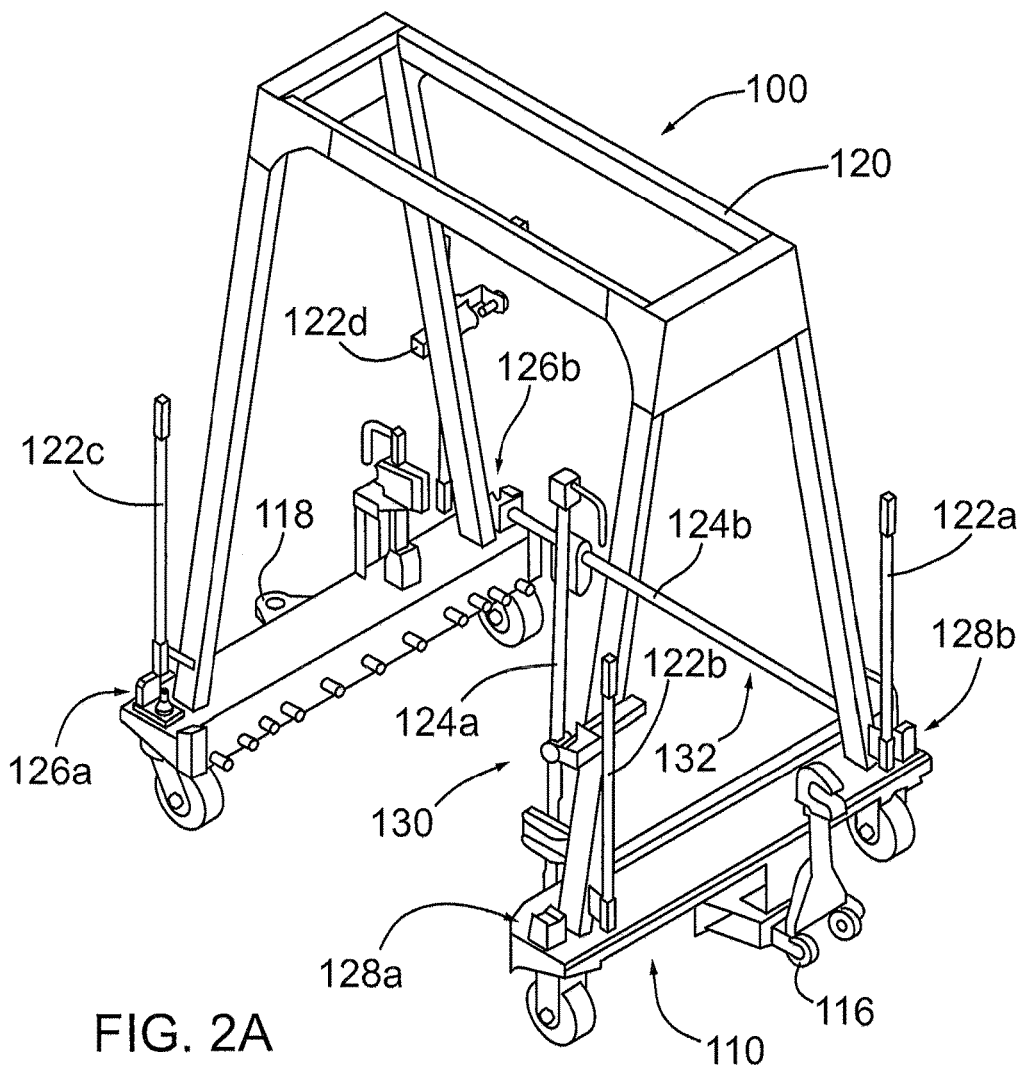
FIG. 2A shows the mother cart of FIG. 1B with the daughter cart removed or disengaged from the mother cart, and with a locking bar in a down or locked position.

Reference is next made to FIG. 1B, which shows the mother cart 100 of FIG. 1A with the daughter cart 200 removed, i.e. unloaded. As shown, the mother cart 100 comprises a lower frame indicated generally by reference 110 and an upper frame indicated by reference 120. The lower frame 110 includes wheels or castors 112, indicated individually by references 112a, 112b, 112c and 112d. As shown, the mother cart 100 includes a tow bar 116 and a hitch 118. The tow bar 116 is configured to couple or engage the hitch 118 of another mother cart 100 or a tractor for moving or pulling the mother cart(s) 100 through an industrial plant or facility. According to an exemplary implementation or embodiment, the mother cart 100 may include daughter cart removal assist handles 122, as shown in FIGS. 1B and 2A, and indicated individually by references 122a, 122b, 122c and 122d. The daughter cart assist handles 122 are configured to provide a mechanical advantage to assist an operator with the removal of a daughter cart from the mother cart 100 (and function in conjunction with the daughter cart support members or loading guides as described below). According to an embodiment, the mother cart 100, i.e. the lower frame 110 and the upper frame 120, are configured to provide two-way loading and unloading of the daughter cart 200, i.e. from either side of the mother cart 100.

As shown in FIGS. 1B and 2A, the lower frame 110 comprises a row or series of daughter cart support members or loading guides 111, each of the rows is indicated by references 113a and 113b. The daughter cart support members 111 are configured to support respective sides of the daughter cart 200 in the loaded position on the mother cart 100. According to an exemplary embodiment, the daughter cart support members 111 are implemented using a plurality of appropriately sized bolts secured into respective positions in the interior side wall of the lower frame 110 of the mother cart 100. Each of the daughter cart support members 111 comprises a bearing to facilitate movement of the daughter cart 200 for loading and unloading from the mother cart 100. According to another aspect or exemplary implementation the loading guides 111 include Delrin™ polymer applied to contact surfaces to reduce friction. According to an embodiment, the daughter cart support members or loading guides 111 comprise a curve-linear or sloped configuration, for example, a 15 degree tapered lead-in, as depicted in FIG. 1D, to facilitate the loading and unloading of the daughter cart 200 from the mother cart 100. According to another embodiment, one of the loading guides, indicated by reference 111' in FIG. 1D, is configured to function as roll-off retarder for the daughter cart 200. According to an exemplary implementation, the loading guide 111' is configured as a fixed guide, e.g. does not include a bearing or other rolling surface in order to provide resistance, or a stop, to the egress of the daughter cart 200 from the mother cart 100.

Figure 1C:
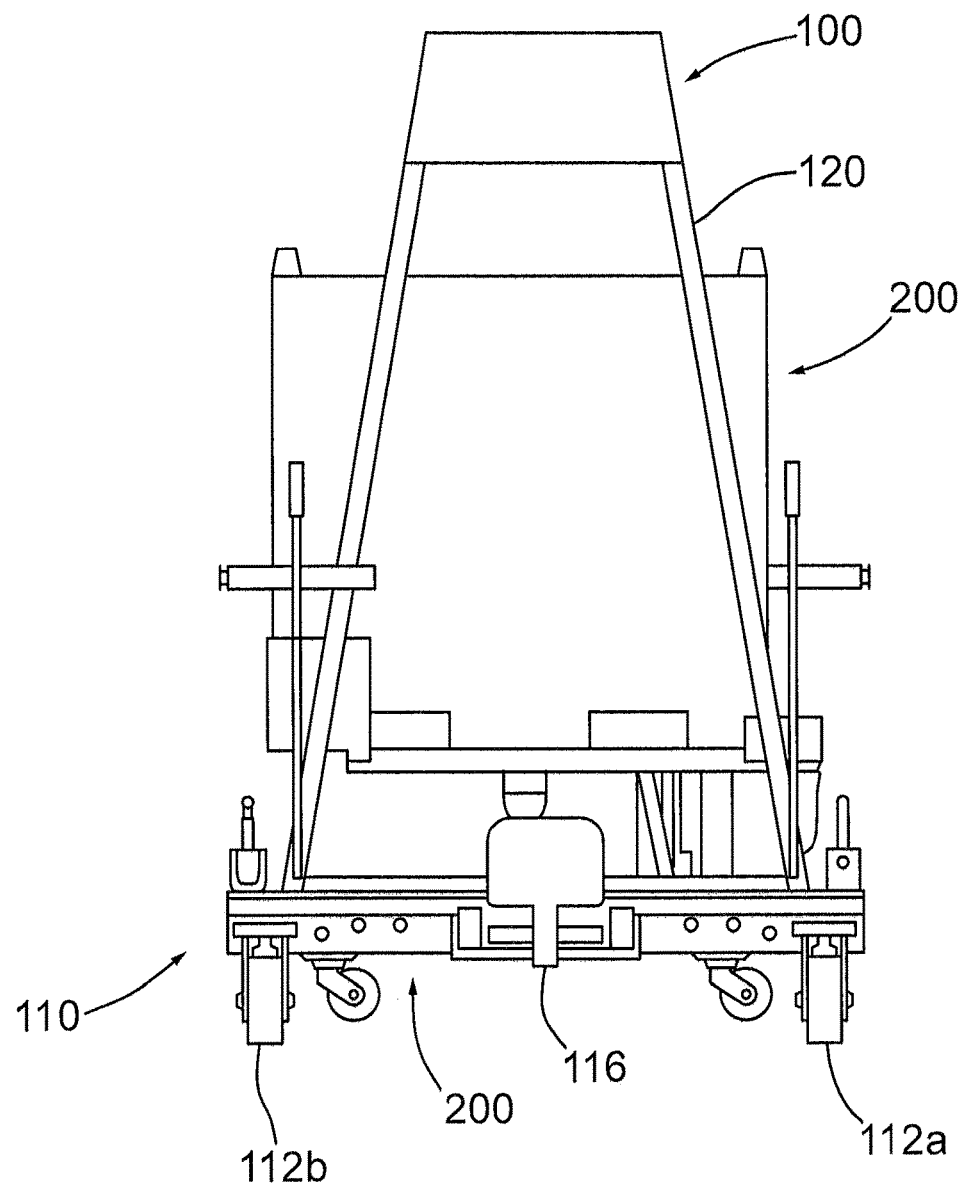
FIG. 1C shows a side view of the mother cart of FIG. 1A with a daughter tilt cart in the mounted or loaded position.

According to an exemplary implementation or application, the mother cart 100 shown in FIGS. 1A and 1B is configured carry standard 48"×48" pallet boxes, pallet/tray packs, and/or pallet/tote packs, as will be readily familiar to those skilled in the art. According to another aspect, the mother cart 100 is configured to provide a ground or floor clearance of approximately 1½" for the daughter cart 200 (e.g. the castors of the daughter cart 200) as shown in FIG. 1C. According to another aspect or exemplary implementation, the mother cart 100 is configured to provide a ground or floor clearance of approximately 2½" for a CC-5 chain in floor application. The CC-5 chain in floor mechanism is an industry standard within the understanding of those skilled in the art. If the CC-5 chain configuration is higher than 2", then the mother cart 100 is configured with a greater clearance, as will be readily apparent to one skilled in the art. According to another aspect, the arrangement of the lower frame 110 and the upper frame 120 of the mother cart 100 are configured to provide an optimized center of mass (e.g. a lower center of mass) of the daughter cart and load. According to an exemplary implementation, the location of the castors (wheels) is configured to optimize stability of the mother cart when carrying a daughter and associated load, for a 50×50 tilt top daughter, for example, as depicted in FIG. 1C.

Figure 2B:
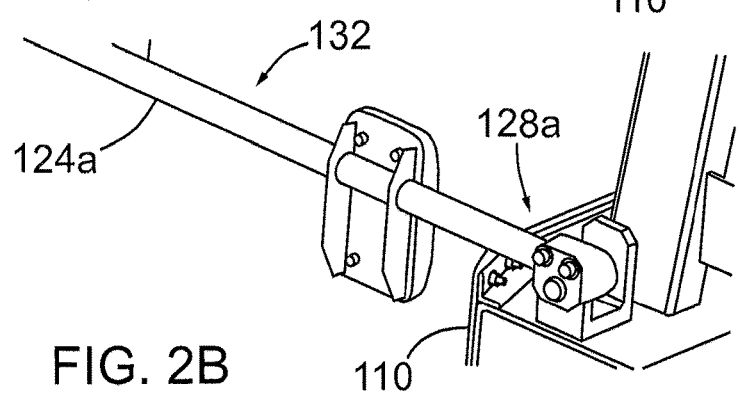
FIG. 2B shows a close up view of the locking end of the locking bar of FIG. 2A according to an embodiment of the invention.
Figure 2C:
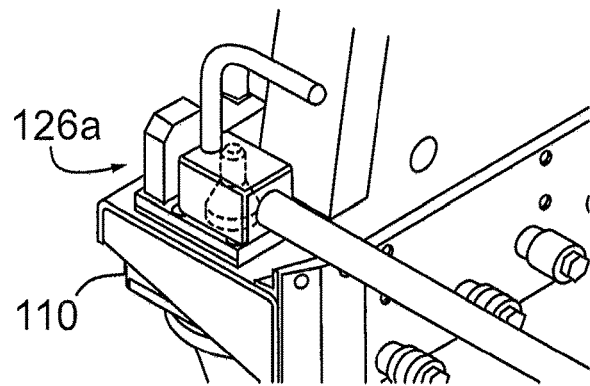
FIG. 2C shows a close up view of the hinged or pivot end of the locking bar of FIG. 2A according to an embodiment of the invention.

As shown in FIG. 2A, the mother cart 100 is configured with a locking bar on each side of the cart indicated by references 124a and 124b (for a two-way loading configuration). As shown in FIGS. 2A and 2B, one end of the locking bar 124 is attached or coupled to the lower frame 110 of the mother cart 100 by a hinge or pivot mechanism 128, indicated individually by references 128a and 128b, and configured to allow the locking bar 124 to move between an open position indicated by reference 130 and a closed or locked position indicated by reference 132 in FIG. 2A. The other end of the locking bar 124 is engaged or locked in the closed position 132 by a lock mechanism or clasp 126, indicated individually by references 126a and 126b in FIG. 2C.

According to another embodiment or exemplary implementation, one of the locking bars 124 is permanently connected in the closed position 132 to increase the structural integrity of the lower frame 110, and/or provide a configuration where one-sided loading/unloading is preferred for the particular industrial application or physical plant configuration.

Figure 3A:
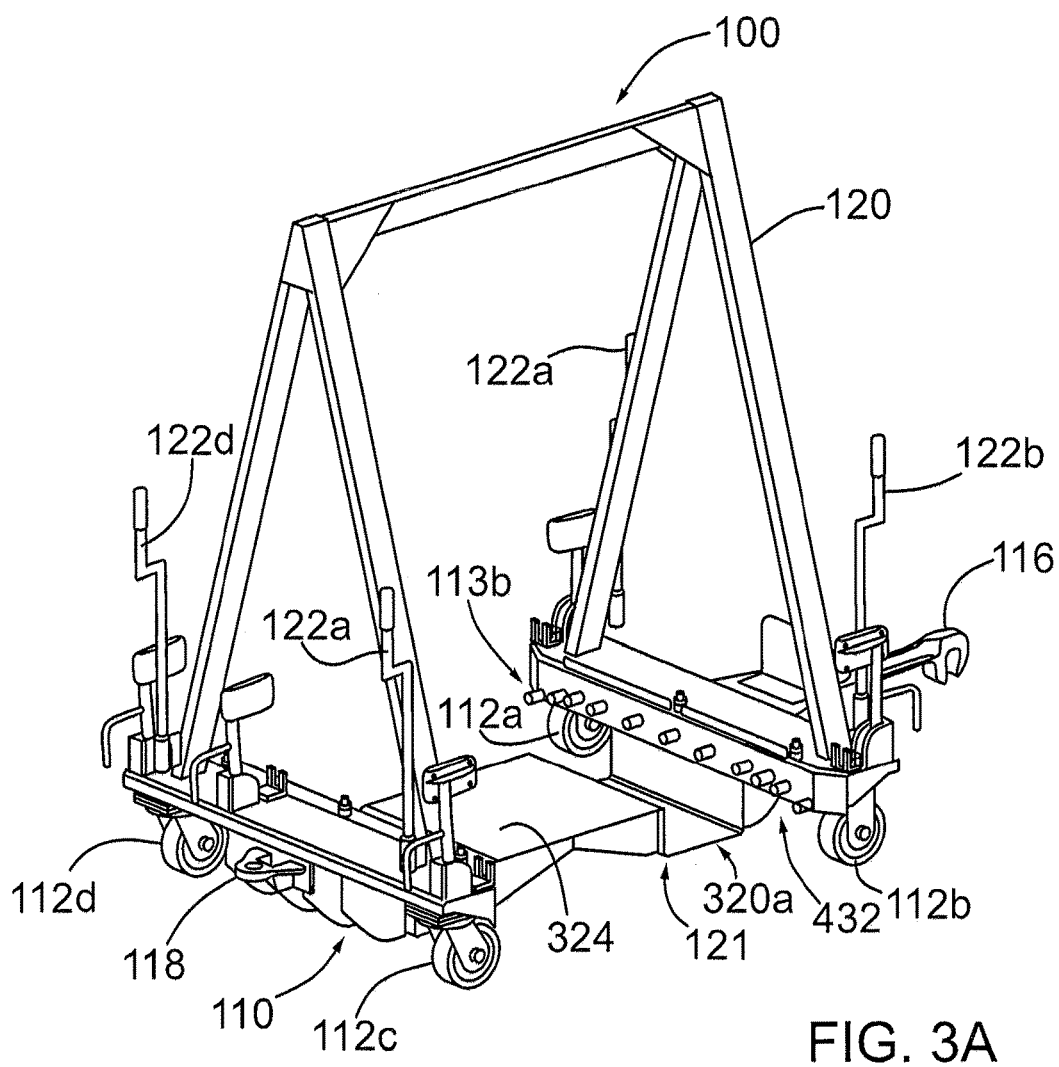
FIG. 3A shows a mother cart with a lower chassis according to another embodiment of the present invention.

Reference is next made to FIG. 3A, which shows a mother cart according to another embodiment of the present invention and indicated generally by reference 101. In addition to the components and elements described above, the mother cart 101 includes a chassis indicated generally by reference 121 in the lower frame 110 as shown. The chassis 121 is configured to provide increased structural integrity or strength for the mother cart 101 and comprises a pair of daughter cart tracks or channels 320, indicated individually by reference 320a in FIG. 3A and reference 320b in FIG. 3B. The daughter cart tracks 320 are configured to receive and support the wheels or castors (or support base) of the daughter cart 200 loaded onto the mother cart 100. In accordance with this embodiment or an exemplary implementation thereof, the daughter cart tracks 320 provide a support surface for the daughter cart 200 and thereby eliminate the need for the daughter cart support and loading guides 111 (as described above). The configuration of the chassis 121 and the daughter cart tracks 320 also provides for the capability of two-way unloading and loading of the daughter cart(s) for example as described above.

Figure 3B:
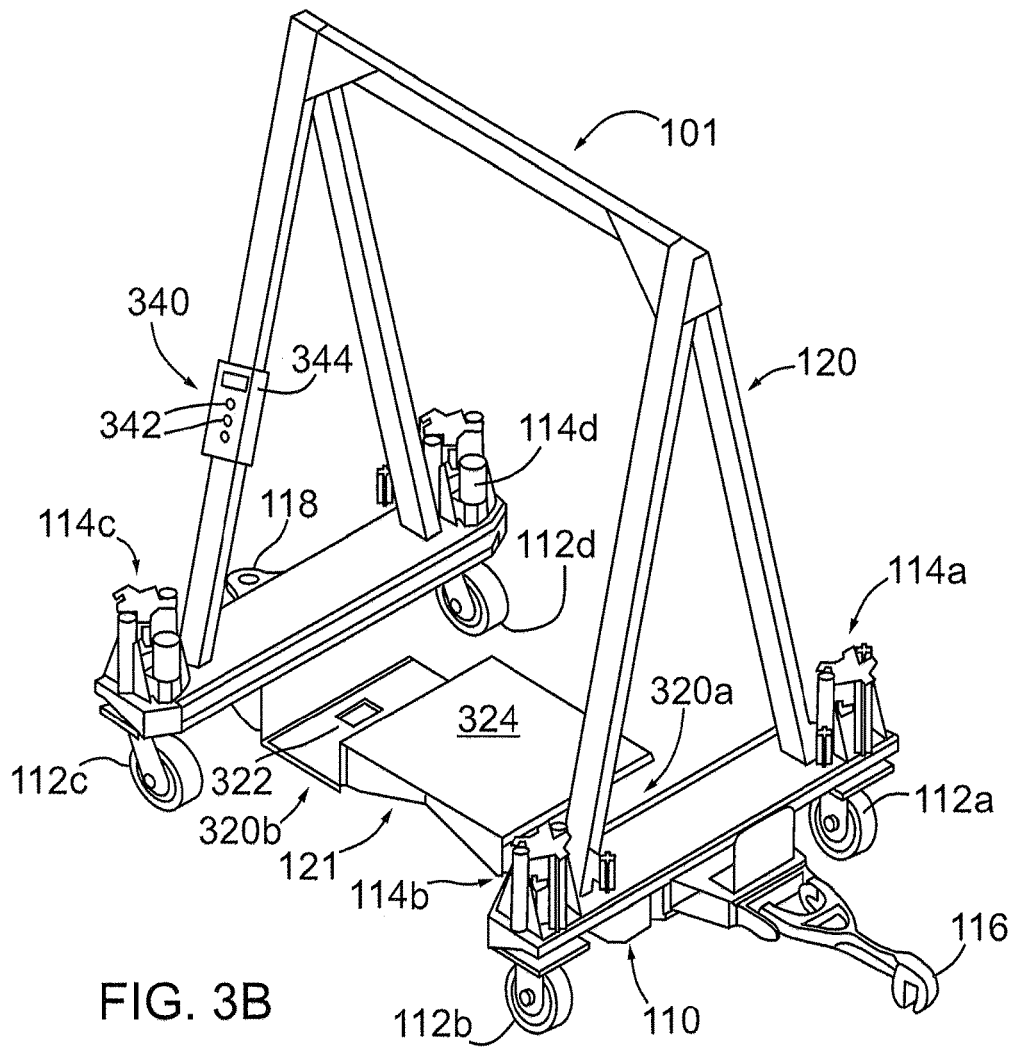
FIG. 3B shows the mother cart of FIG. 3A configured with vertical lift mechanisms or actuators according to another embodiment of the present invention.

As shown in FIGS. 3A and 3B, the chassis 121 includes a belly plate 324, which may be configured as a support surface for the daughter cart 200. As shown in FIG. 3A, the lower frame 110 includes the loading guides 111 and the roll-off retarder guide indicated by reference 111', as was described in more detail above. According to an exemplary implementation, the lower frame 110 and the chassis 121 for the mother cart 101 are configured to provide a floor clearance of approximately 1½".

Referring back to FIG. 3B, one or both of the daughter cart tracks 320 includes a locking slot indicated generally by reference 322. The locking slot 322 is configured to engage the lower frame of the daughter cart 200, for example, a movable or retractable locking member, and thereby secure the daughter cart 200 when the chassis 121 is raised to the travel position. It will be appreciated that the locking slot 322 can supplement the function of the locking bars 124 (as described above), and furthermore, in some applications or implementations, the locking slot 322 may eliminate the need for the locking bars 124, as will be readily understood by skilled in the art.

Figure 4A:
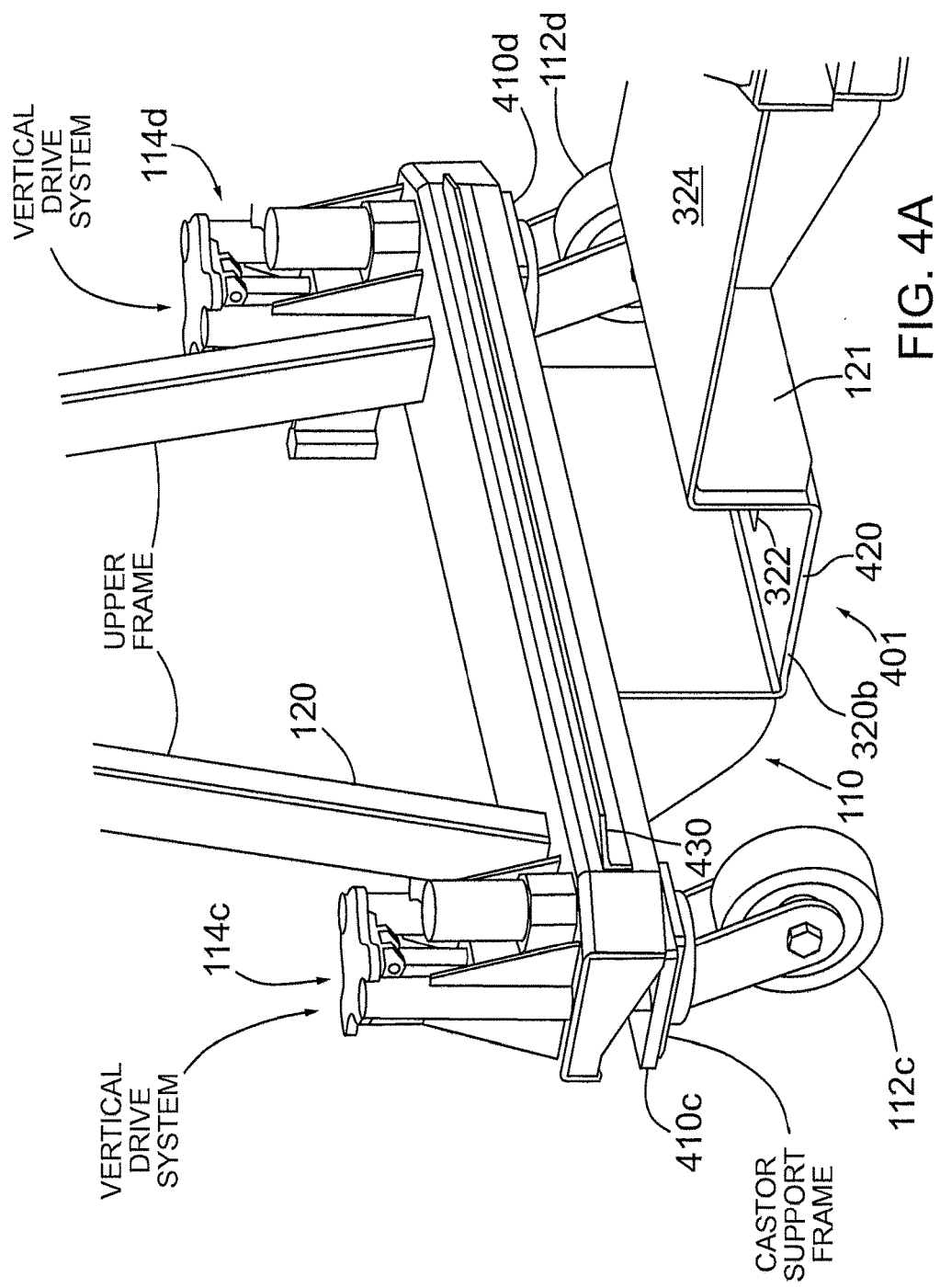
Figure 5A:
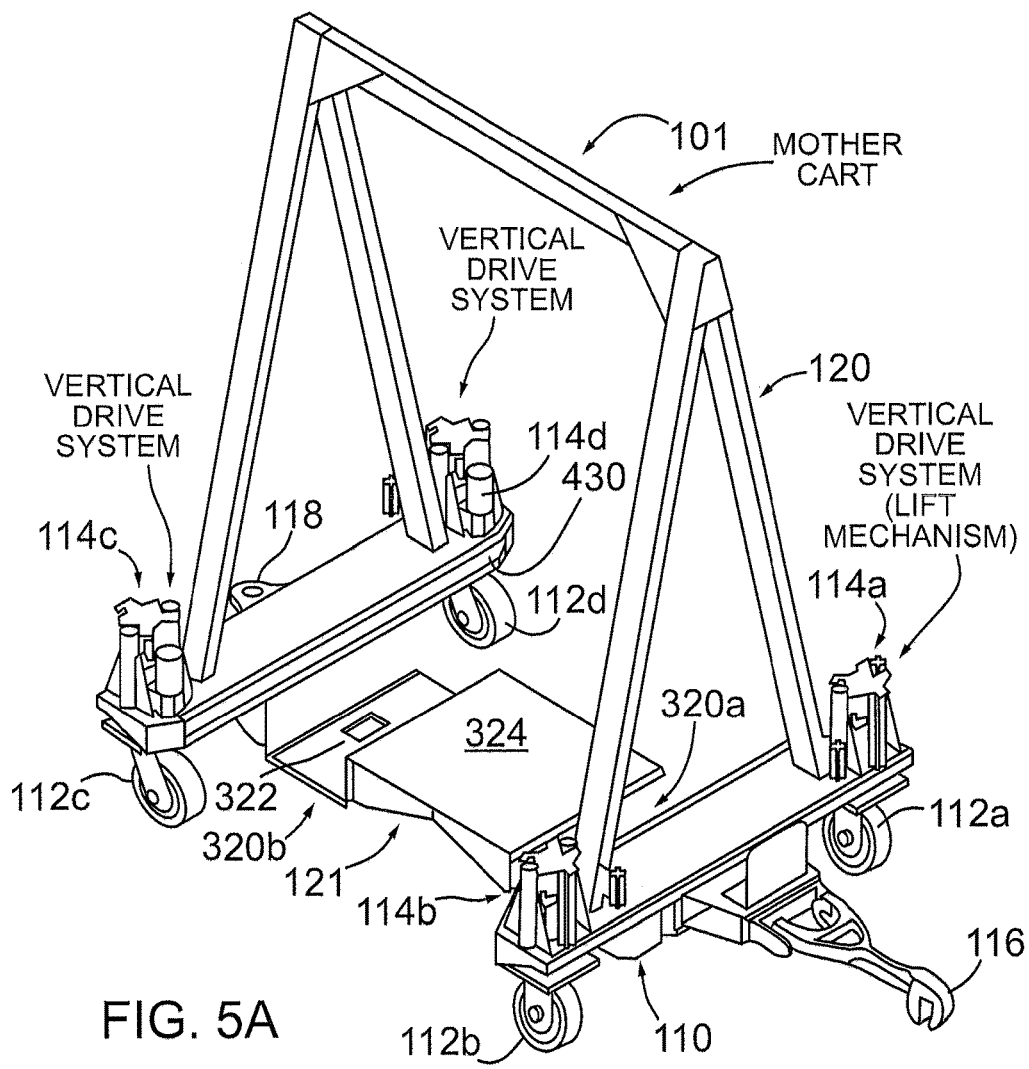
Figure 5B:
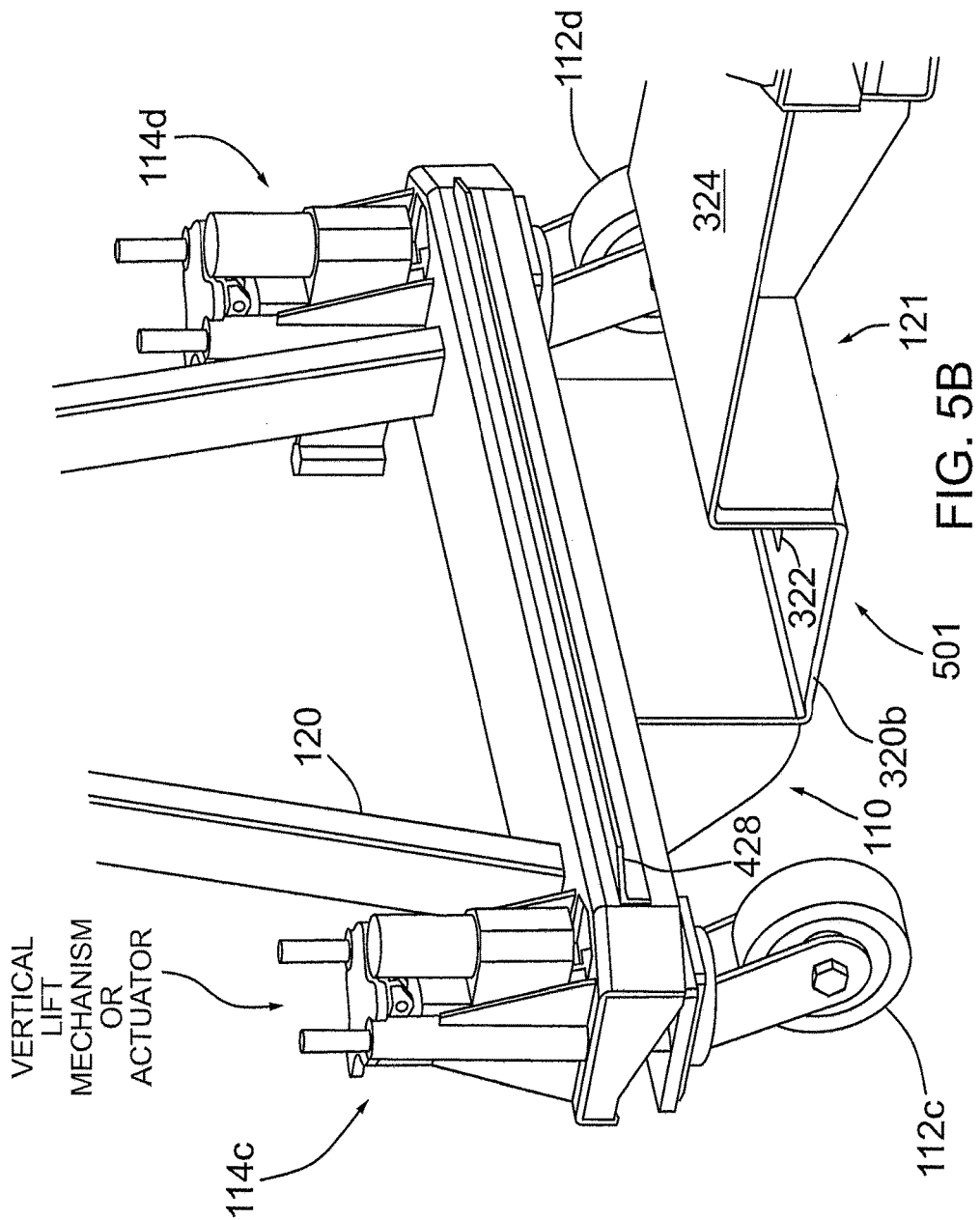

Referring still to FIG. 3B, according to an embodiment, the mother cart 101 includes a lift mechanism operatively coupled to each of the castors or wheels 112, and indicated individually by references 114a, 114b, 114c and 114d. The lift mechanism 114 comprises an actuator, for instance, a hydraulic actuator, and is configured to move the lower frame 110 and the chassis 121 of the mother cart 101 between a raised or loaded position as shown in FIG. 4A, and indicated generally by reference 401, and a lowered or unloading position as shown in FIG. 5B and FIG. 5C and indicated generally by reference 501. According to an exemplary implementation, the lift mechanism 114 is responsive to control signals generated by a controller installed in a control panel or unit, indicated generally by reference 340 in FIG. 3B, in response to an input or actuation by an operator, for raising and lowering the chassis 121 for loading and unloading the daughter cart 200. For example, the controller may be implemented as a hardware microprocessor or microcontroller configured to execute instructions and commands programmed in computer software and stored as executable instructions in memory operatively coupled to the hardware processor for execution in performing the control functions and other associated operations. In an exemplary implementation, the control panel 340 includes controls 342, e.g. buttons, responsive operator actuation, and may further include a display module 344, and other control/status modules. As shown in FIG. 4A, a castor support frame 410 (indicated individually by references 410c and 410d in FIG. 4A) is provided for each of the castors 112. The caster support frame 410 is configured to operatively couple the castor 112 to the lift mechanism 114. According to an exemplary implementation, the lift mechanism or actuators 114 comprise a bidirectional DC motor driven pump with an integral hydraulic cylinder such as the Parker™ Compact EHA unit available from the Parker Hannifin Corporation. The particular implementation details for the lift mechanism and castor configuration, for example, setup, controller hardware and software or firmware configuration and power, will be readily within the understanding of one skilled in the art.

It will be appreciated that the configuration of the mother cart 101 with the lift mechanism provides the capability to adjust or vary the floor or ground clearance, for example, using set point controls or setting for the motors 114. This functionality allows the mother and daughter cart system 10 to be configured for different applications or industrial plant or facilities, for example, CC-5 chain installation with greater than 2" clearance. The mother cart 101 with the lift mechanism also provides the capability to improve the ergonomics and handling of loading and unloading daughter carts by allowing the chassis 121 to be lowered almost flush with the factory floor.

According to an exemplary implementation, the mother cart 101 shown in FIG. 3B is configured to provide a ground clearance of approximately 1½" in the raised or loaded position, as indicated generally by reference 403 in FIG. 4B. In the lowered or unloading position 501, the lower frame or chassis 110 is substantially flush with the ground or floor, for example, as depicted in FIG. 5C. It will be appreciated that the ability to lower the chassis 121 and provide a reduced or substantially flush ground clearance facilitates moving a daughter cart 200 on (i.e. loading) and off (i.e. unloading) from the mother cart 101. To further facilitate moving the daughter cart 200 on and off the mother cart 101, the daughter cart tracks 320 may include a ramp or beveled edge section, indicated generally by reference 420 in FIGS. 4A, 4B and 5B, 5C. According to another exemplary implementation or application, the lower frame 110 and the chassis 121 are configured with the lift mechanism to provide ground clearance between the mother cart and the loaded daughter, e.g. 2.5 to 3", as depicted in FIG. 7. This allows a train comprising one or more mother carts (and associated daughter carts) to be moved in the plant while providing increased clearance, for example, for CC-5 chains configured higher than 2".

Referring to FIGS. 4A and 4B, the mother cart 101 may include a guide indicated generally by reference 430. The guide 430 is configured on the interior surface of the lower frame 110 and adjacent the daughter cart track 320. The guide 430 is configured to facilitate the positioning and the movement of the daughter cart 200 in and out of the track 320.

In operation, the chassis 121 is lowered to rest on the factory floor or in close proximity to the factory floor in the lowered or unloading position 501. This allows the daughter cart 200 to be unloaded and/or loaded manually (i.e. by a human operator), or by an automated actuator (e.g. an industrial robot). It will be appreciated that because the daughter cart 200 does not have to move up or down any appreciable slope or incline to be loaded (or unloaded) on the mother cart 101, the daughter cart 200 is more manageable by a human operator and may also carry heavy loads, i.e. payloads, and as a result be used in a wider range of applications or part delivery/movement operations in a plant. As described above, beveled or sloped leading edge or ramp 420 on each of the daughter cart tracks 320 allows the wheels of the daughter cart 200 to more freely roll on or off the mother cart 101, further facilitating moving or loading the daughter cart 200 onto and off of the mother cart 101.

Figure 7A:
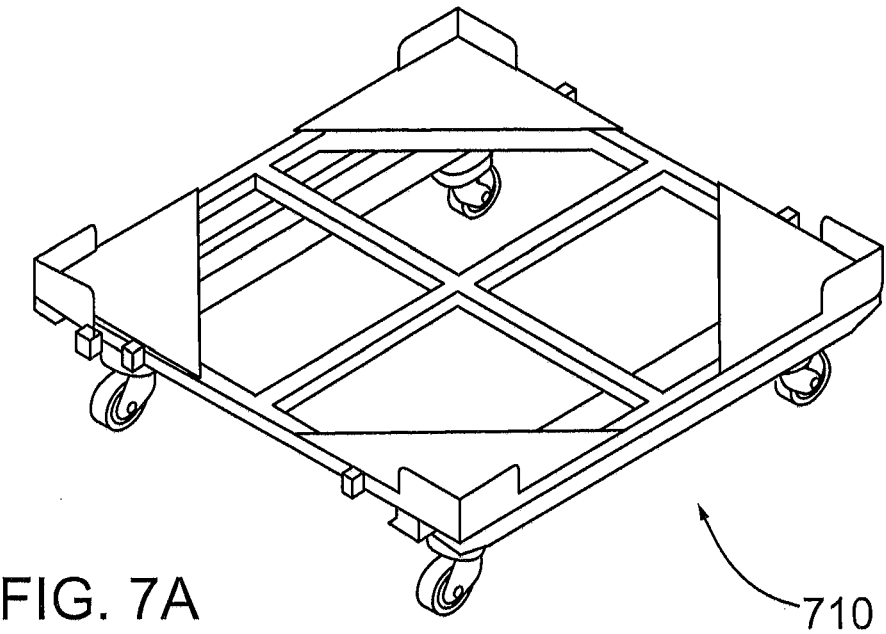
FIG. 7A shows a flat top daughter cart according to an exemplary implementation or embodiment of the invention.
Figure 7B:
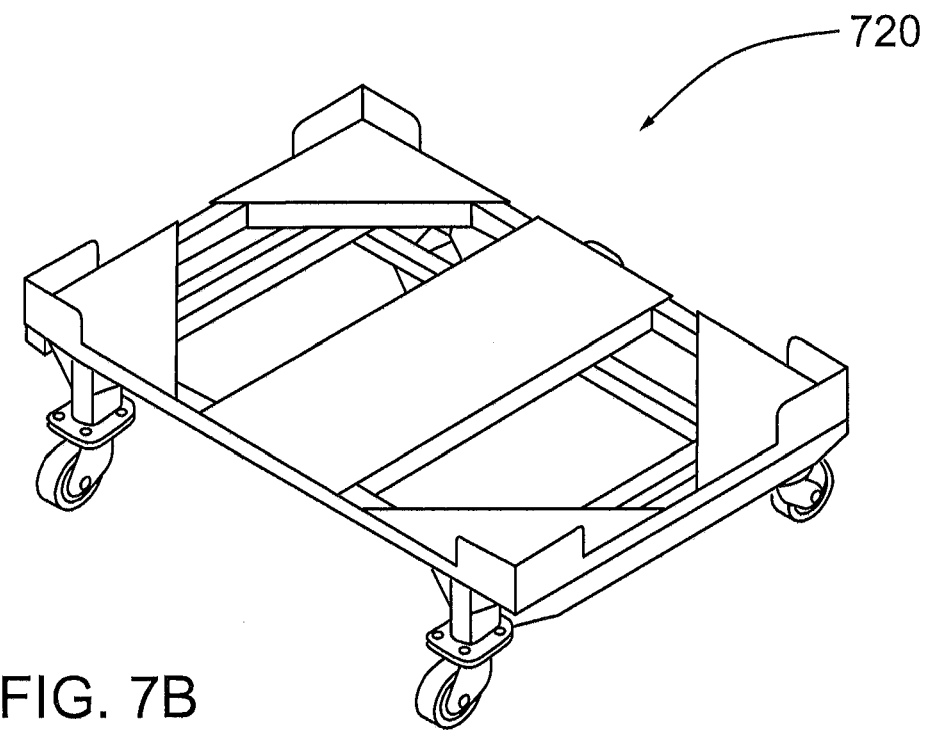
FIG. 7B shows a flat top daughter cart according to another exemplary implementation or embodiment of the invention.

Reference is next made to FIGS. 7A and 7B, which show embodiments of a flat top daughter cart, indicated individually by references 710 and 720. The flat top cart 710 comprises a "50×50" configuration as will be understood by one skilled in the art. The flat top cart 720 comprises a "34×50" configuration as will also be understood by one skilled in the art.

Figure 8:
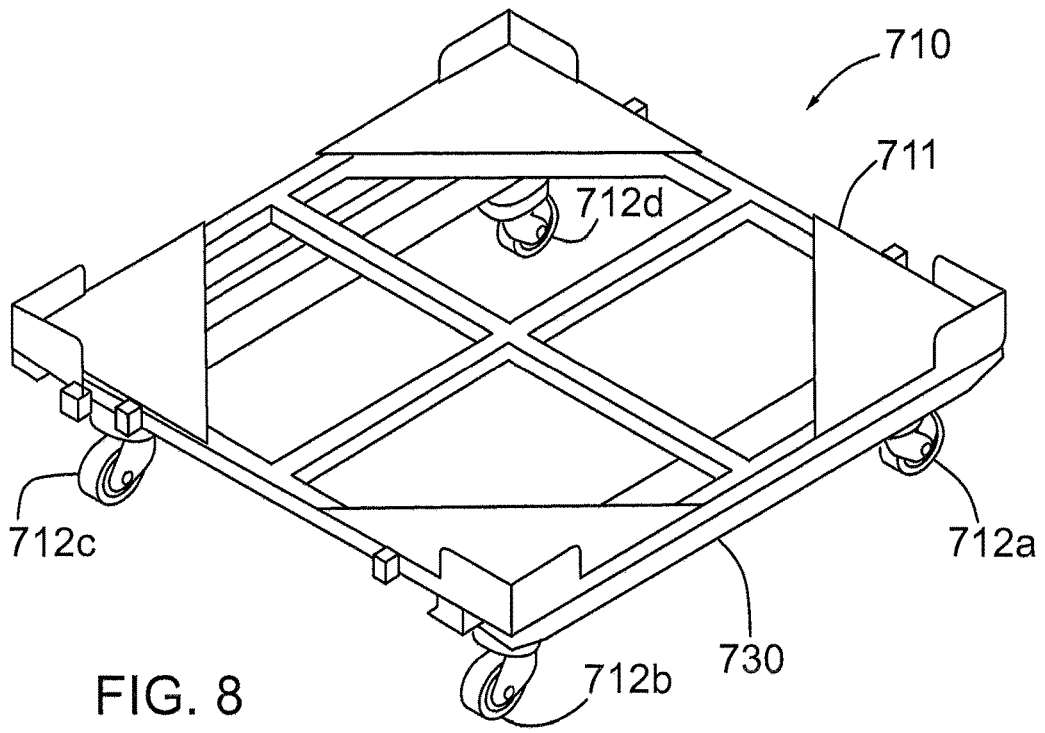
FIG. 8 shows the flat top daughter cart of FIG. 7A in more detail.
Figure 9:
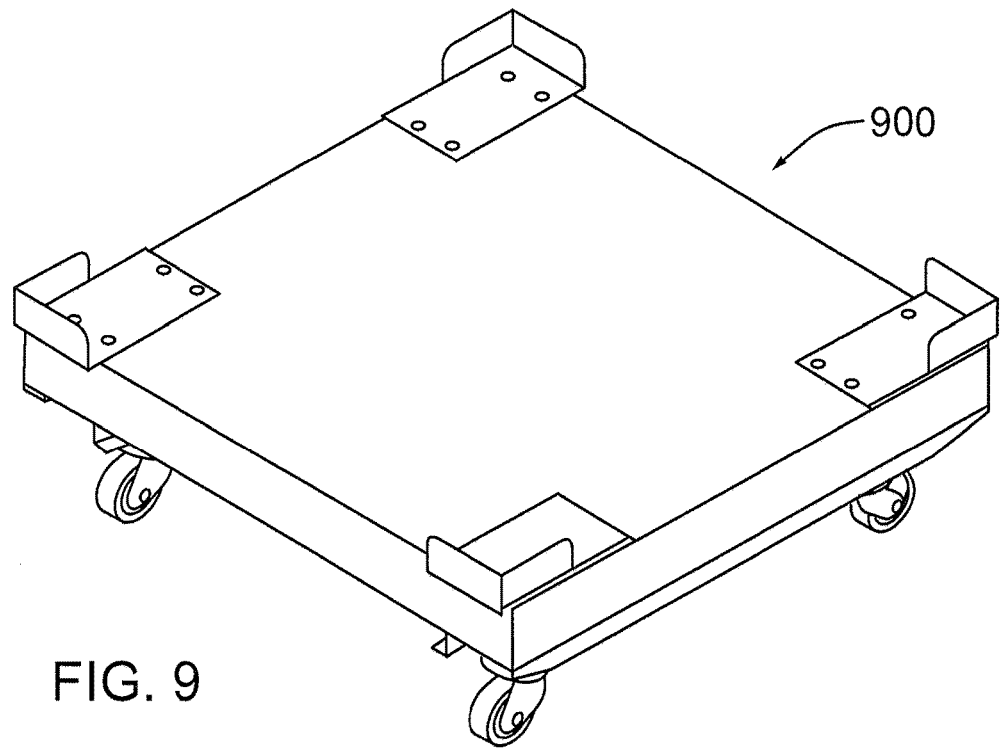
FIG. 9 shows a "plastic pallet" daughter cart according to an exemplary implementation or embodiment of the invention.

Reference is next made to FIG. 8, which shows the flat top cart 710 in more detail. As shown, the flat top cart 710 comprises a frame 711 and castors 712, indicated individually by references 712*a*, 712*b*, 712*c* and 712*d*. The flat top cart 710 may also include Delrin™ strips to reduce friction on contact surfaces and thereby facilitate loading and unloading the cart 710 from the mother cart 100. Another variant of the flat top cart is a plastic pallet as shown in FIG. 9 and indicated generally by reference 900. In known manner, the daughter carts are loaded with parts or components for transport in an industrial facility, for example, automotive transmissions. Also in known manner, the daughter carts may be fitted with a bin or other type of container, which is then used to carry parts or components, for example, air filters, in an automotive assembly plant or application.

Figure 10A:
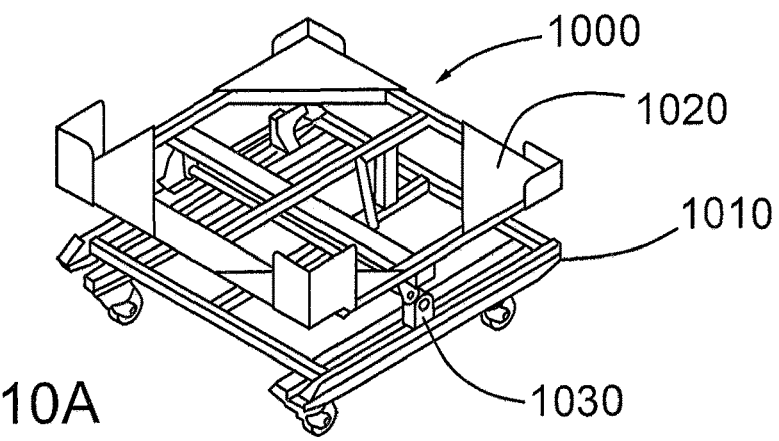
FIG. 10A shows a "tilt-top" daughter cart according to an exemplary implementation or embodiment of the invention.
Figure 10B:
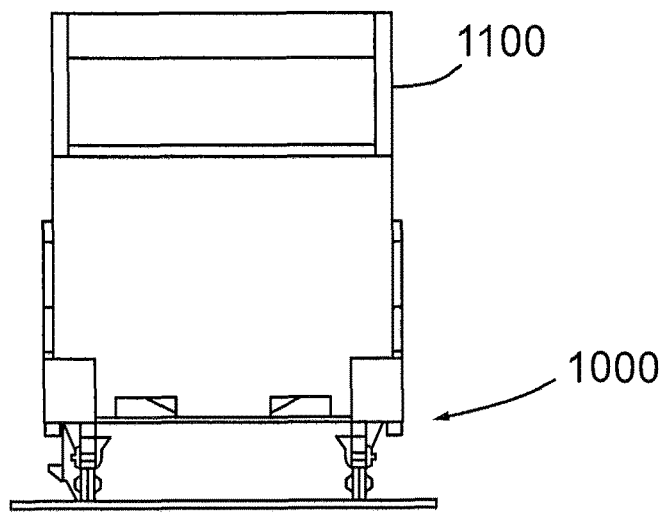
FIG. 10B shows the tilt-top daughter cart of FIG. 9A loaded with a bin or crate.
Figure 10C:
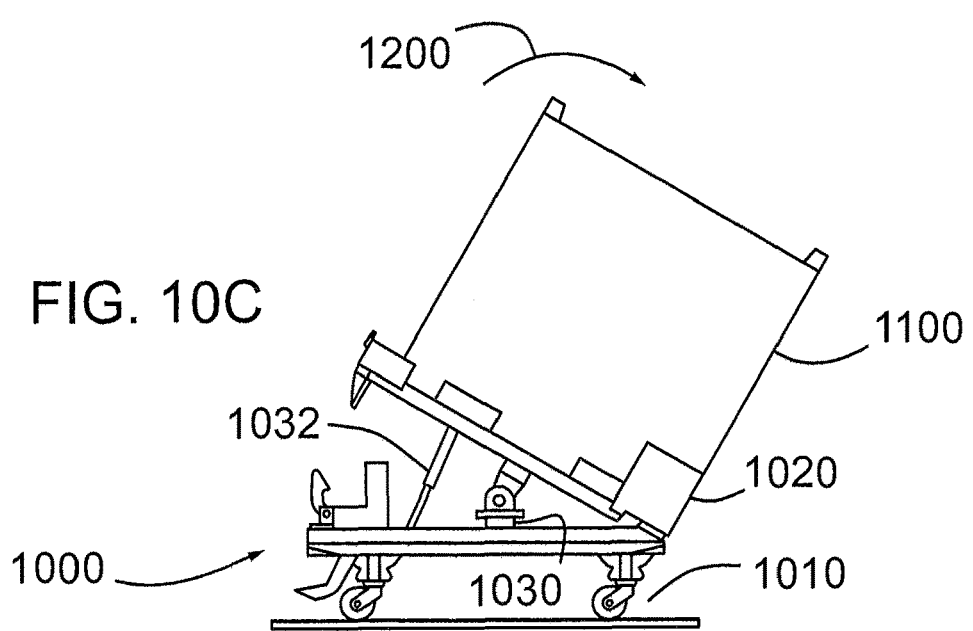
FIG. 10C shows the tilt-top daughter cart of FIG. 9C with the tilt platform in a tilted position.

Reference is next made to FIGS. 10A, 10B and 10C which show a daughter tilt cart, indicated generally by reference 1000. The daughter tilt cart 1000 comprises a base 1010 configured with castors or wheels as shown. The daughter tilt cart 1000 comprises a tilt platform 1020 which is operatively coupled to the base 1010 through a hinge or pivot mechanism indicated generally by reference 1030. The tilt platform 1020 is configured to support a load, e.g. a bin, as shown in FIG. 10B, and indicated generally by reference 1100. As shown in FIG. 10C, the daughter tilt cart 1000 includes an actuator, for example, a hydraulic cylinder mechanism, that is operatively coupled to the base 1010 and the tilt platform 1020 and configured to move, i.e. pivot, the tilt platform 1020 and the bin 1100 to a tilted position as indicated by arrow 1200. The particular implementation details of the daughter tilt cart 1000 are readily within the understanding of one skilled in the art.

Figure 11:
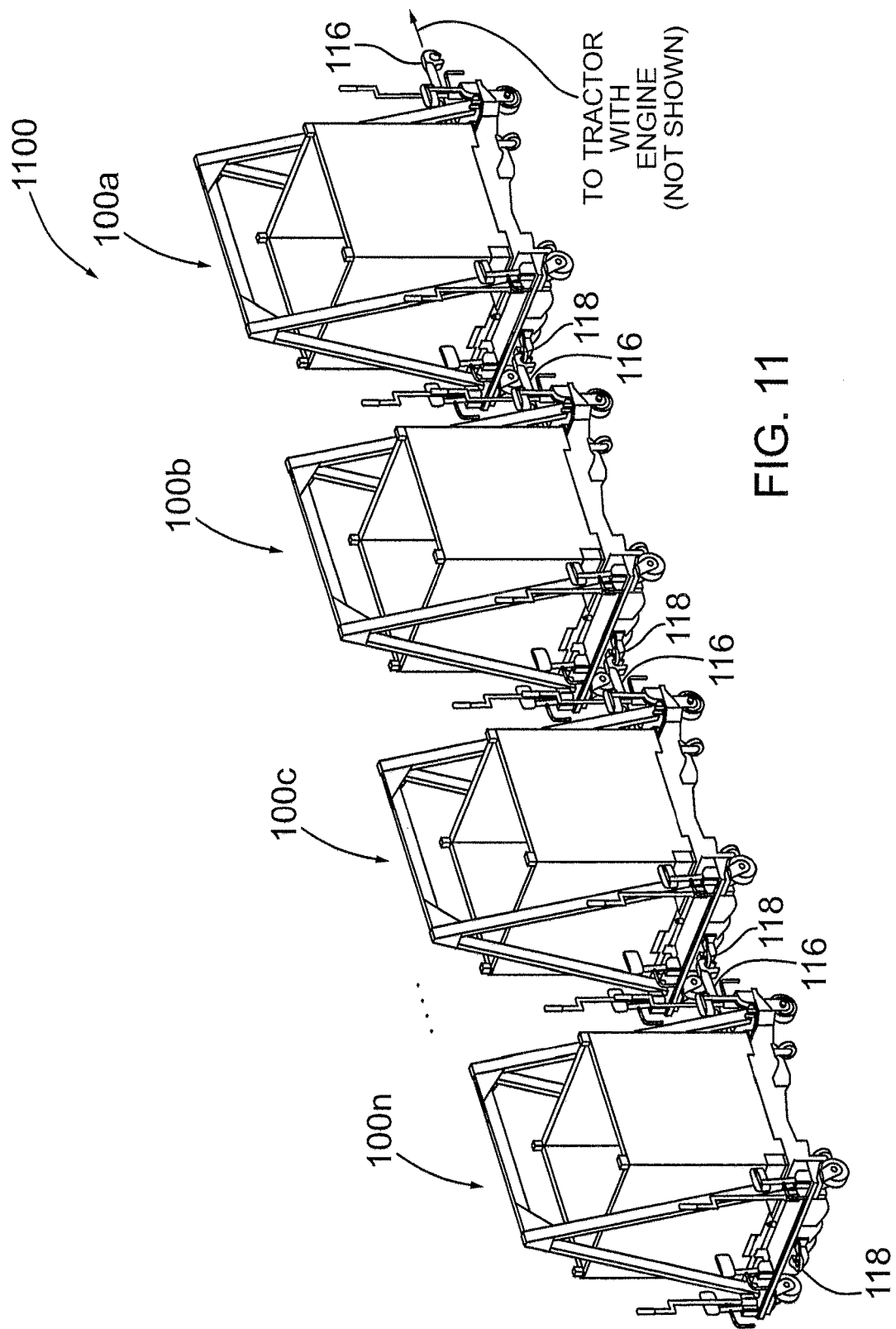
FIG. 11 shows a plurality of mother/daughter carts according to an embodiment of the invention coupled together to form an industrial parts or components delivery system or train.
Figure 12A:
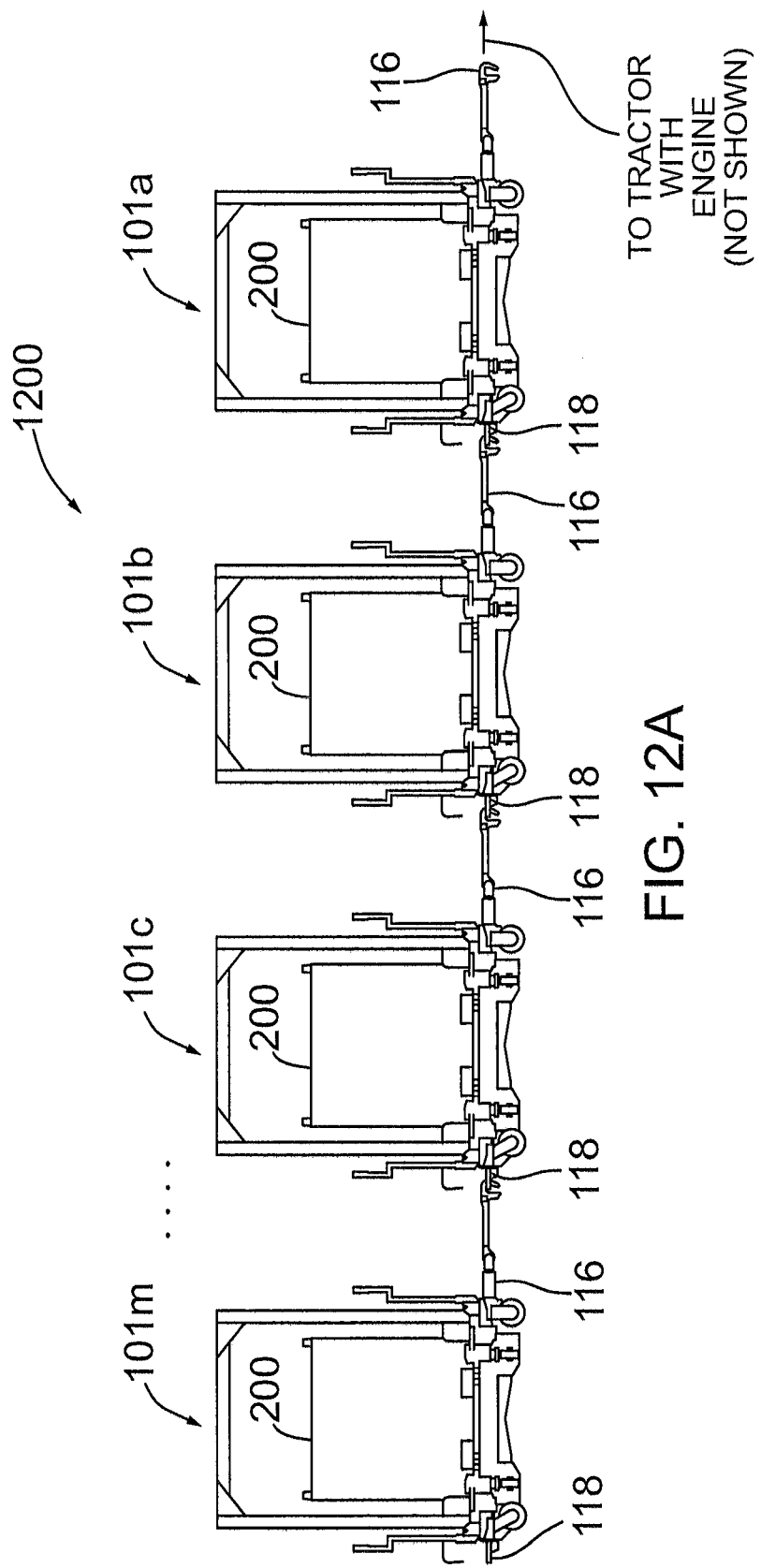
FIG. 12A shows a plurality of mother/daughter carts according to another embodiment of the invention coupled together to form an industrial parts or components delivery system or train.
Figure 12B:
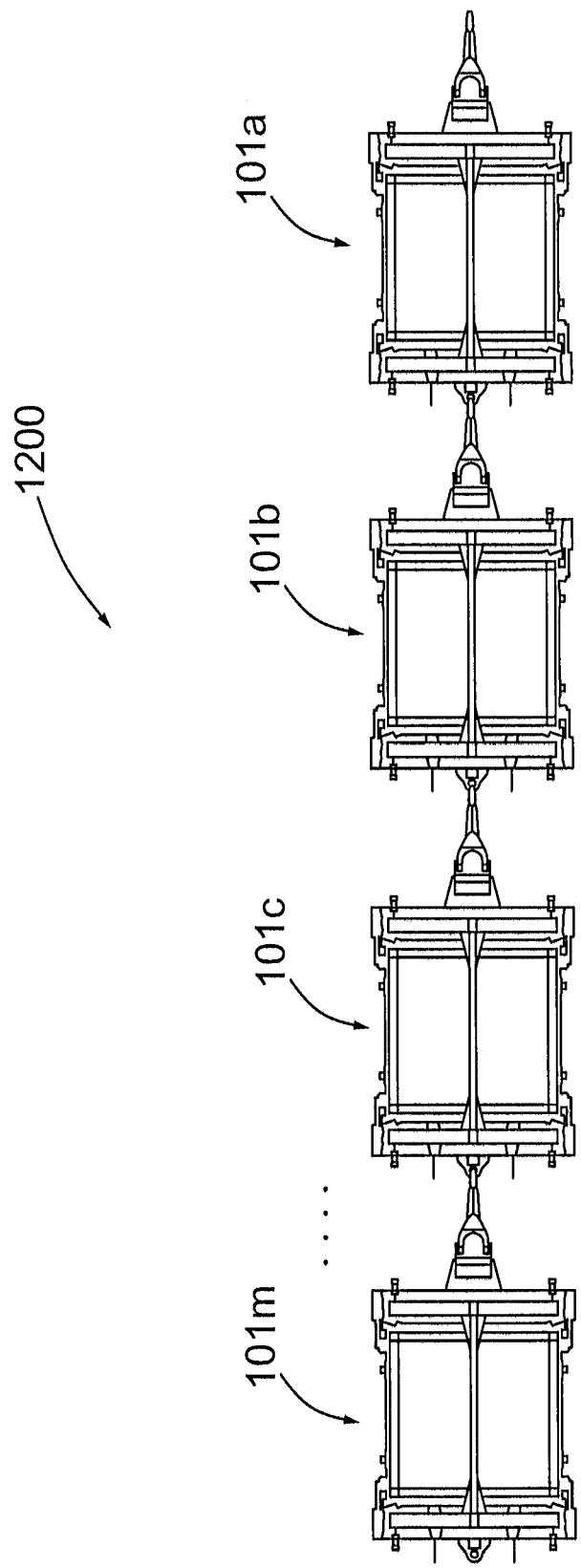
FIG. 12B is a top view of the industrial parts delivery system or train of FIG. 12B.

One or more mother carts are coupled together to form a train or parts delivery system which is moved through an industrial plant or factory, e.g. an automotive assembly plant, by a tractor, engine other drive or propulsion system (not shown). For example, as shown in FIG. 11, a plurality of the mother carts 100 (described above with reference to FIGS. 1A-1D and FIGS. 2A-2C), indicated individually by references 100*a*, 100*b*, 100*c*, . . . 100*n* are coupled together through the tow-bar 116 and hitch 118 to form an industrial parts delivery system and train, indicated generally by reference 1100. Similarly, a plurality of the mother carts 101 (described above with reference to FIGS. 3A-3B, FIGS. 4A-4B and FIGS. 5A-5C), indicated individually by references 101*a*, 101*b*, 101*c*, . . . 101*m* are coupled together through the tow-bar 116 and hitch 118 to form an industrial parts delivery system and train, indicated generally by reference 1200, for example, as depicted in FIGS. 12A and 12B.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A mother cart suitable for transporting a daughter cart, said mother cart comprising:
   a lower frame;
   an upper frame, said upper frame being connected to said lower frame;
   said lower frame including a plurality of wheels configured to allow the mother cart to be moved;
   said lower frame including a plurality of support guides, said support guides being configured to support the daughter cart in a raised position to provide a predetermined ground clearance;

said lower frame having two open sides so as to provide for two-way loading and unloading of the daughter cart on the mother cart;

wherein said plurality of support guides are configured as two rows of support guides, one row being configured on a first interior surface of said lower frame, and said other row being configured on a second interior surface of said lower frame, wherein said second interior surface is opposite said first interior surface; and wherein at least some of said plurality of support guides comprise a sloped configuration so as to facilitate the loading and unloading of the daughter cart from the mother cart.

2. The mother cart as claimed in claim 1, wherein said plurality of support guides comprise a rolling surface to further facilitate the loading and unloading of the daughter cart from the mother cart.

3. The mother cart as claimed in claim 2, wherein one of said support guides in said sloped configuration comprises a fixed guide without a rolling surface so as to retard movement of the daughter cart.

4. The mother cart as claimed in claim 1, further including first and second locking bars, each of said locking bars spanning one of said open sides, and each of said locking bars having one end coupled to said lower frame and configured to move between an open position and a closed position, and in said closed position said locking bar preventing unloading of the daughter cart from the mother cart.

5. The mother cart as claimed in claim 4, further including a hitch and a tow bar, said tow bar being configured to couple to said hitch of another mother or to a hitch on a tractor for moving one or more of said mother carts.

6. An industrial cart train, comprising:
two or more mother carts coupled together to form a parts delivery system suitable for an industrial application;
each of said mother carts comprising,
a lower frame;
an upper frame, said upper frame being connected to said lower frame;
said lower frame including a plurality of wheels configured to allow the mother cart to be moved;
said lower frame including a plurality of support guides, said support guides being configured to support a daughter cart in a raised position to provide a predetermined ground clearance;
said lower frame having two open sides so as to provide for two-way loading and unloading of the daughter cart on the mother cart;
wherein said plurality of support guides are configured as two rows of support guides, one row being configured on a first interior surface of said lower frame, and said other row being configured on a second interior surface of said lower frame, wherein said second interior surface is opposite said first interior surface; and
wherein at least some of said plurality of support guides comprise a sloped configuration so as to facilitate the loading and unloading of the daughter cart from the mother cart.

7. The industrial cart train as claimed in claim 6, wherein said plurality of support guides comprise a rolling surface to further facilitate the loading and unloading of the daughter cart from the mother cart.

8. The industrial cart train as claimed in claim 6, wherein one of said support guides in said sloped configuration comprises a fixed guide without a rolling surface so as to retard movement of the daughter cart.

9. The industrial cart train as claimed in claim 6, further including first and second locking bars, each of said locking bars spanning one of said open sides, and each of said locking bars having one end coupled to said lower frame and configured to move between an open position and a closed position, and in said closed position said locking bar preventing unloading of the daughter cart from the mother cart.

* * * * *